US008607177B2

(12) United States Patent  
Verbeure

(10) Patent No.: US 8,607,177 B2
(45) Date of Patent: Dec. 10, 2013

(54) NETLIST CELL IDENTIFICATION AND CLASSIFICATION TO REDUCE POWER CONSUMPTION

(75) Inventor: Tom Verbeure, Cupertino, CA (US)

(73) Assignee: Nvidia Corporation, Santa Clara, CA (US)

(*) Notice: Subject to any disclaimer, the term of this patent is extended or adjusted under 35 U.S.C. 154(b) by 781 days.

(21) Appl. No.: 12/101,055

(22) Filed: Apr. 10, 2008

(65) Prior Publication Data

US 2009/0259982 A1 Oct. 15, 2009

(51) Int. Cl.
*G06F 17/50* (2006.01)
*G06F 1/00* (2006.01)

(52) U.S. Cl.
USPC ........... 716/109; 716/100; 716/101; 716/104; 716/106; 713/322; 713/324

(58) Field of Classification Search
USPC .......... 716/1, 2, 4, 5, 8, 10, 11; 713/322, 324; 703/13, 14
See application file for complete search history.

(56) References Cited

U.S. PATENT DOCUMENTS

| | | | |
|---|---|---|---|
| 6,380,764 B1* | 4/2002 | Katoh et al. | 326/93 |
| 6,493,856 B2* | 12/2002 | Usami et al. | 716/10 |
| 7,007,247 B1* | 2/2006 | Wang et al. | 716/2 |
| 7,434,072 B2 | 10/2008 | Peirson et al. | |
| 7,529,958 B2 | 5/2009 | Roth et al. | |
| 7,624,215 B2 | 11/2009 | Axford et al. | |
| 7,730,248 B2* | 6/2010 | Goss et al. | 710/261 |
| 7,739,533 B2 | 6/2010 | Rauschmayer et al. | |
| 7,945,875 B2* | 5/2011 | Anand et al. | 716/103 |
| 7,954,078 B1* | 5/2011 | Wang et al. | 716/127 |
| 2003/0204757 A1 | 10/2003 | Flynn | |
| 2006/0184808 A1 | 8/2006 | Chua-Eoan et al. | |
| 2006/0226895 A1 | 10/2006 | Hoshi et al. | |
| 2008/0307240 A1* | 12/2008 | Dahan et al. | 713/320 |
| 2009/0049220 A1* | 2/2009 | Conti et al. | 710/267 |
| 2009/0054075 A1* | 2/2009 | Boejer et al. | 455/456.1 |
| 2009/0204831 A1* | 8/2009 | Cousson et al. | 713/322 |
| 2009/0210831 A1* | 8/2009 | Correale et al. | 716/4 |
| 2009/0271167 A1* | 10/2009 | Zhu et al. | 703/14 |
| 2010/0064271 A1* | 3/2010 | Chen | 716/5 |

FOREIGN PATENT DOCUMENTS

| | | |
|---|---|---|
| GB | 2457170 | 8/2009 |
| WO | 2004102623 | 11/2004 |

OTHER PUBLICATIONS

IEEE Journal of Solid-State Circuits, vol. 42, No. 1, Jan. 2007.
Application as Filed; U.S. Appl. No. 12/029,442; Brian Smith; et al., filed Feb. 11, 2008.
Application as Filed; U.S. Appl. No. 12/029,404; Brian Smith; et al., filed Feb. 11, 2008.
Application as Filed; U.S. Appl. No. 12/101,028; Brian Smith; et al., filed Apr. 10, 2008.

* cited by examiner

*Primary Examiner* — Helen Rossoshek

(57) ABSTRACT

In an integrated circuit device, a power circuit for maintaining asserted values on an input output pin of the device when a functional block of the device is placed in a sleep mode. The device includes a power circuit disposed along the periphery of the device, the power circuit configured to maintain power when the device is placed in a low-power mode. A plurality of input output blocks are included in the device and are for receiving external inputs for the integrated circuit device and for providing outputs from the integrated circuit device. The power circuit is coupled to provide power to at least one of the input output blocks to maintain state when the integrated circuit device is in the low-power mode.

13 Claims, 8 Drawing Sheets

500

NETLIST CELL IDENTIFICATION AND CLASSIFICATION TO REDUCE POWER CONSUMPTION

FIELD OF THE INVENTION

The present invention is generally related to digital computer systems.

BACKGROUND OF THE INVENTION

One of the important features of integrated circuits deigned for portable applications is their ability to efficiently utilize the limited capacity of the battery power source. Typical applications include cellular telephones and personal digital assistants (PDAs), which might have a Lithium ion battery or two AAA alkaline batteries as the power source. Users have come to expect as much as three to four weeks of standby operation using these devices. Standby operation refers to the situation where the cellular phone, handheld device, etch is powered on but not being actively used (e.g., actively involved in a call). Generally, it is estimated that the integrated circuits providing the functionality of the device is only performing useful work approximately 2% of the time while the device is in standby mode.

Removing the power supply from selected circuits of a device during standby is a technique employed by designers for battery powered applications. The technique is generally applied only to circuit blocks outside of the central processing unit (CPU). A primary reason for not applying this technique to CPUs, has been the difficulty in being able to retain the current processor state information necessary to continue execution after coming out of the standby mode. One solution for this limitation involves saving the current processor state information to external storage mechanisms (e.g., such as flash memory, a hard disk drive, etc.). In such a case there is the overhead required in transferring the state to and from the external storage mechanism. Even if the battery powered device had a hard disk drive, and many don't, the time consuming state transfer may not meet the real time response requirements of the application when the device needs to wake up to respond to a new event.

Other issues are presented when the functionality of a device is implemented by a system-on-a-chip (SOC) integrated circuit. For example, when the core of a system-on-a-clip CPU is temporarily powered down (e.g., deep sleep mode), some of the outputs that connect to assorted peripherals (e.g. LCD display, SPI interface, SDIO, Hard-disk, etc.) should be held in an idle state to avoid having to reprogram the peripheral or lose existing context in the peripheral. This causes a problem since some peripherals need particular values to be set at their inputs (which are connected to the outputs of the SOC) to hold a safely inactive state. For example, if a device is connected to a SOC that is clocked on the falling edge of a clock signal, and the SOC is powered down with that signal as a logic 1, but the power down state is a logic 0 (e.g., ground), it will cause a spurious clock on that signal.

This problem is farther exacerbated by the heavy use of pin-muxing or sharing, in which a single pin can have multiple functions in different designs by different customers. In one design a pin may be set to act as part of an SPI interface that wants to be held low when in sleep mode, while the same pin in another design, perhaps by a different customer may be used as a UART pin which would need to be held high when the CPU is put to deep sleep mode. While pin-muxing provides a way to put more features in each chip and allows the chip to be more suitable for a wide range of designs, it precludes knowing exactly at IC design time what each pin will be used for. A more flexible method of configuring the power down states is needed.

One solution to this problem would be to have a register for each pin that drives the pin to any one of the allowed number of states, such as. Input, output 0, output 1, output Hi-Z, open drain, etc. This is a workable solution, but has a problem that since normally the signals that control these functions come from the core of the SOC, they will not be present when the core is powered down in deep sleep mode. To overcome this, a second set of registers on the SOC on a special power domain (AO) which remains powered when the rest of the core is powered down in deep sleep mode is used to control the pins.

The special power domain allows the state information of these IO pads to be preserved. However the big problem is that it requires many signals from the portion of the chip that is in the special power domain to be routed to each pad. For example, with 300 signal pads and 3 wires per pad, as many as 900 traces have to be routed on the integrated circuit die, which is a large number at the top level of an integrated circuit die layout. These pad control signals must also be powered by the AO rail, which complicates the distribution of this AO rail or the routing of these pad control signals. The peripherals must be able to wake the processor from Deep Sleep mode when they assert an interrupt to be serviced.

The signals which must be powered by the AO domain require a significant number of routing and switching cells within the netlist design which must be configured for connection and powering by the AO domain. Conservatively, the signal routing cells are routinely coupled to the always on domain. This ensures that required signals that may be needed to wake the chip can be properly received and processed, or that state information of certain I/O pins be accurately retained for proper functioning. However, such conservative classification of signal routing cells as AO domain cells leads to a number of such cells being so classified, when they are actually not required for proper functioning. For example, some cells are configured to relay signals from a core domain, which is shutdown in sleep mode. There is no need for the cells to be powered when the core domain is shut down. Such misclassified cells simply lead to excessive leakage current and excessive power consumption.

Thus, what is needed is a solution enabling the powering down of a digital integrated circuit device for reduced standby power consumption while retaining the integrity of the operating state. What is further needed is a solution for identifying those cells of an integrated circuit netlist that do not need to be powered during sleep mode.

SUMMARY OF THE INVENTION

Embodiments of the present invention provide a solution for enabling the powering down a digital integrated circuit device for reduced standby power consumption while retaining the integrity of the operating state. Embodiments of the present invention can identify the cells of an integrated circuit netlist that do not need to be powered during sleep mode and ensure the cells are not wastefully leading current when the device is in standby or deep sleep.

In one embodiment, the present invention is implemented on a computer aided design system which performs a method for modifying netlist cells of an integrated circuit device to reduce power consumption. The method includes accessing a circuit netlist, lie circuit netlist representing an integrated circuit design to be realized in physical form, and modifying a plurality of cells of the netlist by using a per cell iterative search. The iterative search functions by determining those cells of the circuit netlist that are coupled to an always on power domain (e.g., which remains powered when the device enters a sleep mode, standby mode, etc.), and determining those cells of the circuit netlist that are coupled to a second domain, wherein the second domain is a sleep mode enabled power domain (e.g., which has its power shut down when the device enters sleep mode, standby mode, etc.). The iterative search modifies those cells that are coupled to the second domain by configuring them to receive power from the second domain. Thus, when power to second domain is shut down, those cells are also shut down, ensuring they do not wastefully leak current when they are not needed.

In one embodiment, the per cell iterative search functions by examining each cell of the circuit netlist and altering an examined cell upon determining whether the examined cell is coupled to the second domain. When such a cell is found, it is altered to ensure it receives power from the second domain. In one embodiment, the per cell iterative search is complete when each cell of the circuit netlist is examined and no alterations are performed.

In one embodiment, the per cell iterative search is initiated at a functional block within Tele second power domain and traces those cells that cascade from the functional block. The search can trace cells that provide functionality for the second power domain from one cell to the next, ensuring that when the second power domain is shut down the connecting cells are also shut down. In one embodiment, the per cell iterative search is initiated at an input output pad providing functionality for the second power domain and traces those cells that cascade from the input output pad.

In this manner, embodiments of the present invention for can identify those cells of an integrated circuit netlist that do not need to be powered during sleep mode and ensure the cells are not wastefully leaking current when the device is in standby or in deep sleep.

BRIEF DESCRIPTION OF THE DRAWINGS

The present invention is illustrated byway of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figure 1:
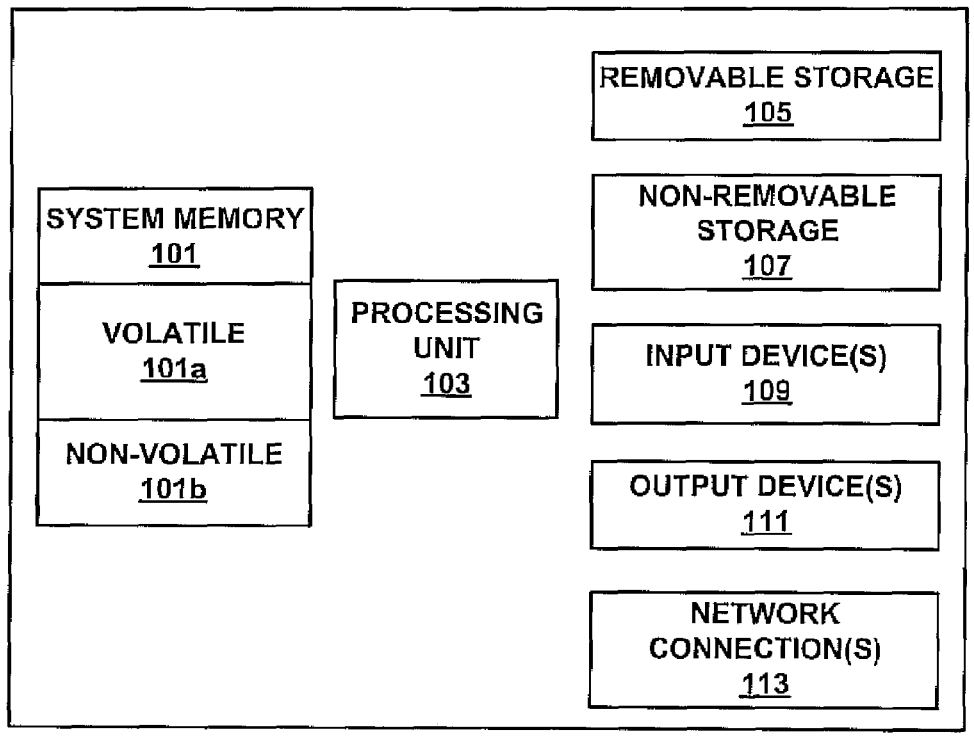
FIG. 1 shows an exemplary computer system according to one embodiment. Specific aspects of the present invention are operable within a programmed computer aided design (CAD) system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device (e.g., system 100 of FIG. 1), that manipulates and transforms data represented as physical (electronic) quantities within the computer system's registers and memories into other data similarly represented as physical quantities within the computer system memories or registers or other such information storage, transmission or display devices.
Computer System Environment FIG. 1 shows anti exemplary computer system 100 according to one embodiment. Specific aspects of the present invention are operable within a programmed computer aided design (CAD) system. Computer system 100 depicts the components of a CAD system providing the execution environment for certain hardware-based and software-based functionality for the above described embodiments. Computer system 100 can be implemented as, for example, a desktop computer system or server computer system. Computer system 100 typically includes at least some form of computer readable media. Computer readable media can be a number of different types of available media that can be accessed by computer system 100 and can include, but is not limited to, computer storage media.

In its most basic configuration, computer system 100 typically includes processing unit 103 and memory 101. Depending on the exact configuration and type of computer system 100 that is used, memory 101 can be volatile (e.g., such as DRAM, etc.) 101a, non-volatile 101b (e.g., such as ROM, flash memory, etc.) or some combination of the two.

Additionally, computer system 100 can include mass storage systems (e.g., removable 105 and/or non-removable 107) such as magnetic or optical disks or tape. Similarly, computer system 100 can include input devices 109 and/or output devices 111 (e.g., such as a display). Computer system 100 can further include network connections 113 to other devices, computers, networks, servers, etc. using either wired or wireless media. As all of these devices are well known in the art, they need not be discussed in detail.

Figure 2:
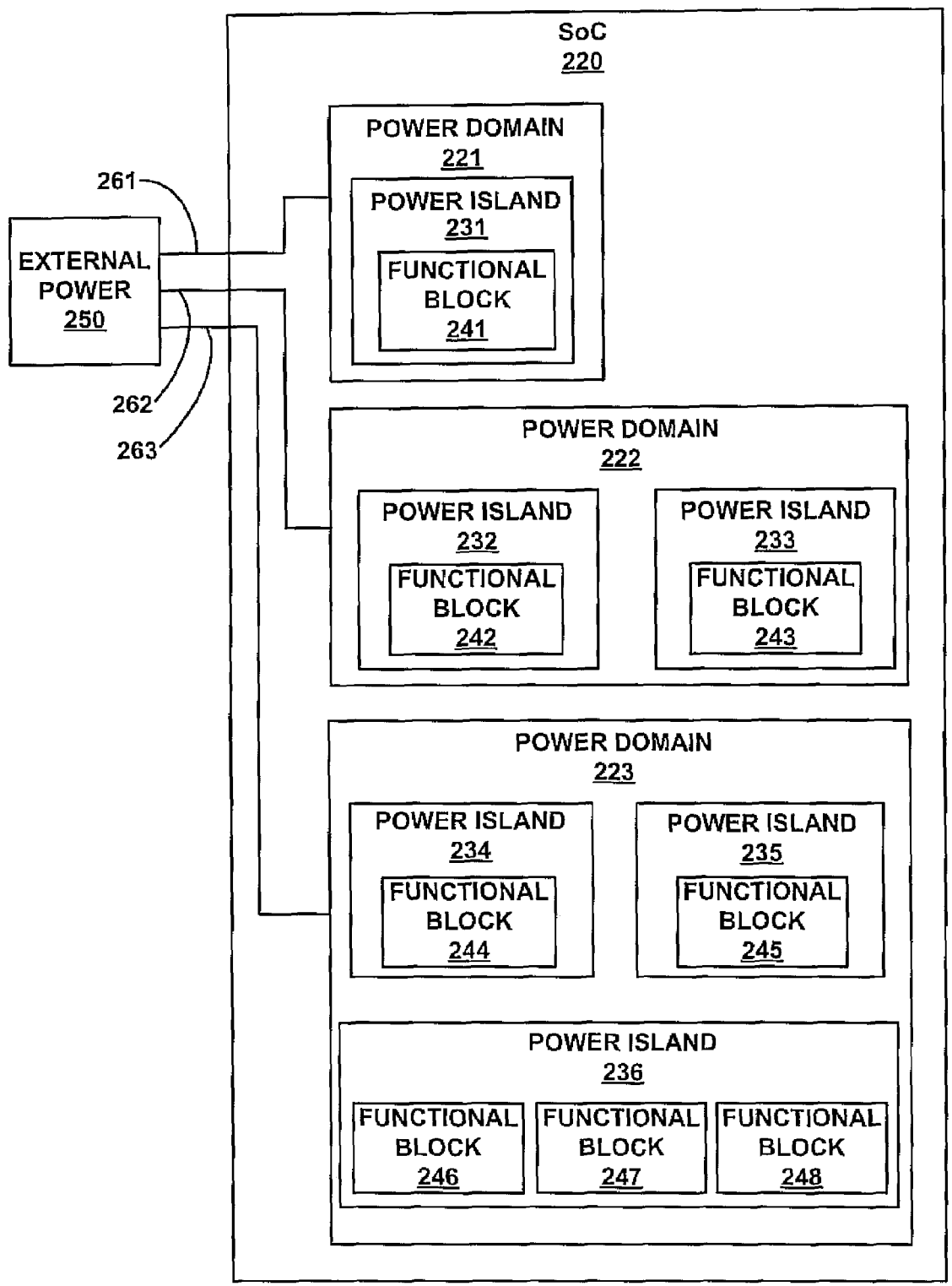
FIG. 2 shows a diagram of an exemplary generalized system architecture 200 in accordance with one embodiment of the present invention.

FIG. 2 shows a diagram of an exemplary generalized system architecture 200 in accordance with one embodiment of the present invention. As depicted in FIG. 2, system 200 includes a programmable SOC (system on a chip) integrated circuit device 220 which includes a plurality of power domains 221-223.

The SOC 220 includes an architecture that is optimized along multiple power domains and multiple power islands within the power domains to enable a customized and optimized profile of power consumption versus performance. In the FIG. 2 embodiment, each of the power domains 221-223 are coupled to a dedicated voltage rail 261-263. This allows power to be supplied to one power domain independently with respect to the other power domains. The voltage rails 261-263 are individually powered by an external power source 250.

Each of the power domains includes at least one power island. The power islands 231-236 are shown. The power islands are configured to receive power from the particular power domain in which they reside. Power islands are distinguished from power domains, in part, by the characteristic that power islands are not supplied their own dedicated voltage rail.

A power island typically comprises a set of components (e.g., sequential logic, storage, interconnects, etc.) that can be power gated with respect to the power domain. As used herein, power gating refers to the connecting or disconnecting of a power island to or from the power circuits of a power domain. The connecting and disconnecting is typically implemented using CMOS gating logic.

Each of the power islands includes one or more functional blocks. The functional blocks 241-248 are shown. More than one functional block can reside within a given power island, such as, for example, the power island 236 which includes the three functional blocks 246-248. The frictional blocks draw their power from the circuits of the power island in which they reside. When a power island is shut down (e.g., via power gating), each of the functional blocks that are within that power island are also shut down.

Each functional block typically comprises special-purpose logic, storage, hardware resources, and the lice that is configured to provide a specific device functionality. Each of the functional blocks 241-248 are purposely designed and optimized to excel at accomplishing a block specific intended task. The intended tasks are sufficiently granular such that particularly demanding tasks can be performed by using a greater number of functional blocks, while comparatively simple tasks can be performed by using a lesser number of functional blocks. For example, some tasks may only require a single functional block for implementation.

Thus, for example, to implement comparatively simple requested device functionality (e.g., display a clock on a display connected to the integrated circuit device 200) a single functional block can be utilized, such as the functional block 241. The other functional blocks can be shut down by turning off power to their respective power domains, such as shutting down the power domains 222 and 223 and turning off the voltage rails 262 and 263. As another example, to implement a comparatively demanding requested device functionality (e.g., playing a 3-D game) multiple functional blocks can be utilized, such as, the functional blocks 241, and 244-248. The other functional blocks 241-243 can be shut down by turning off power to the domain 222.

It should be noted that power consumption of a given functional block will vary depending upon its state. For example, in one case when a domain is turned off, power to that domain as provided by its dedicated voltage rail is turned off in this state, functional blocks within the domain are shut down and have very little leakage current. This is in comparison to a second case when a domain is turned on but an island within the domain is shut down via power gating. In this state, the functional blocks within the island will have somewhat more leakage current than the case where the entire domain is shut down. In a third case, a power domain is tinned on, an island within the power domain is turned on, but a functional block within the island is turned off via clock gating. In this state, the functional block within the island will have fill leakage current. This is in comparison to the filly active case, where the functional block is turned on and is executing its intended function. In this state, the functional block will have its fill leakage current and its fill switching current.

Figure 3:
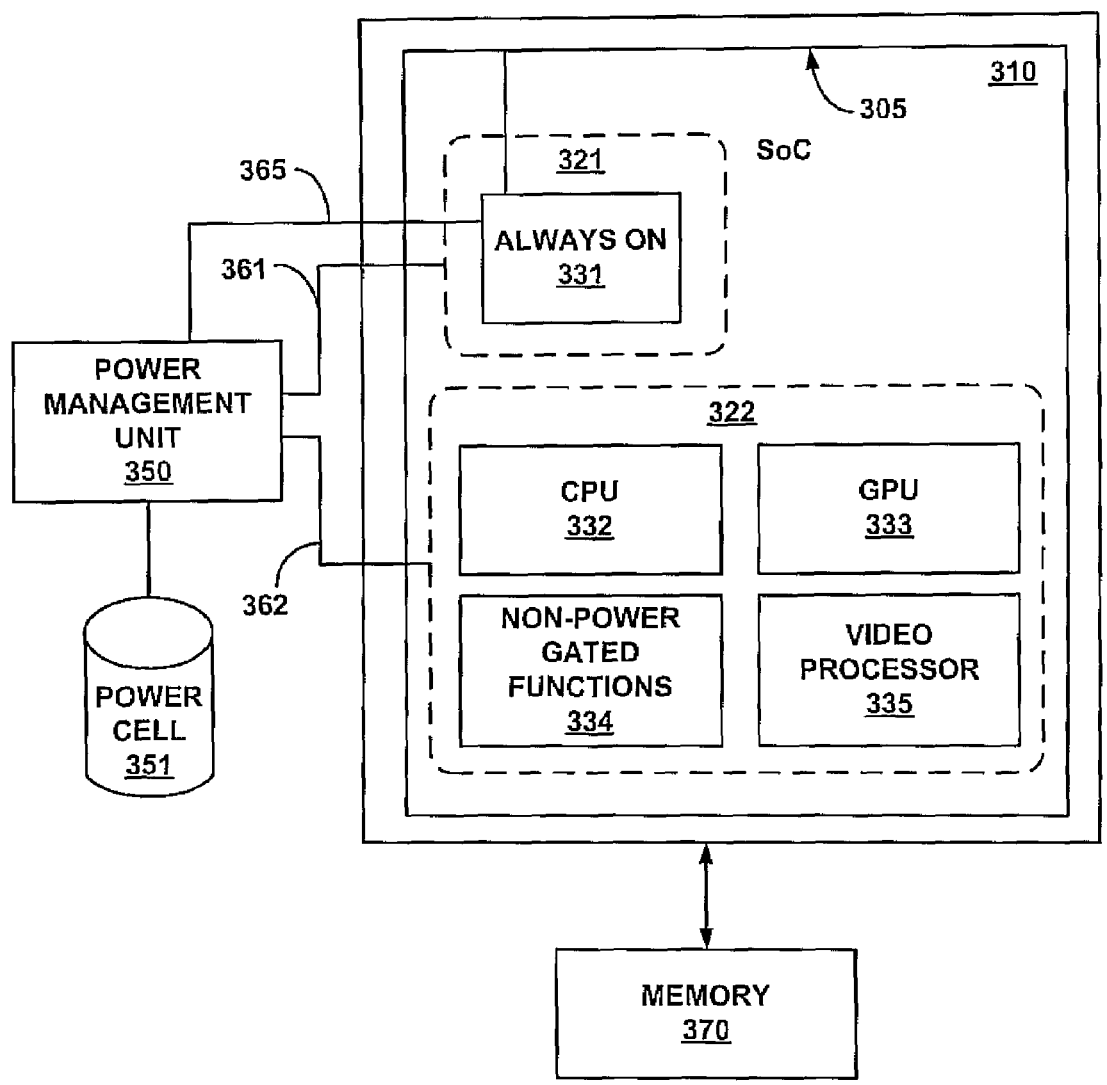
FIG. 3 shows a diagram of an exemplary targeted system architecture 300 in accordance with one embodiment of the present invention.

FIG. 3 shows a diagram of an exemplary targeted system architecture 300 in accordance with one embodiment of the present invention. As depicted in FIG. 3, system 300 includes a programmable SOC integrated circuit device 310 which includes a two power domains 321 and 322. The power domain 321 includes an "always on" power island 331. The power domain 322 includes a CPU power island 332, a GPU power island 333, a non-power gated functions island 334, and a video processor island 335.

The FIG. 3 embodiment of the system architecture 300 is targeted towards the particular intended device functions of a battery-powered handheld SOC integrated circuit device. The SOC 310 is coupled to a power management unit 350, which is in turn coupled to a power cell 351 (e.g., one or more batteries). The power management unit 350 is coupled to provide power to the power domain 321 and 322 via the dedicated power rail 361 and 362, respectively. The power management unit 350 functions as a power supply for the SOC 310. The power management unit 350 incorporates power conditioning circuits, voltage pumping circuits, current source circuits, and the like to transfer energy from the power cell 351 into the required voltages for the rails 361-362.

The always on power island 331 of the domain 321 includes functionality for waking up the SOC 310 from a sleep mode. For example, in one embodiment, the always on domain 321 is configured to consistently have power applied to its constituent circuits. For example, the constituent circuits of the power domain 321 can be configured to draw power from the voltage rail 361 and to receive a clock signal in an uninterrupted manner. This enables the power domain 321 to execute sequential state machine logic, instructions, etc. while the rest of the SOC 310 is powered down. This can allow, for example, an internal state machine within the power domain 321 to detect walk event signals, the signals indicating a wake up from the sleep mode. For example, in a deep sleep mode, the voltage rail 362 and the domain 322 can be shut down. The components of the always on domain 321 will remain active, waiting for a wake-up signal.

The always on power island 331 is coupled to a power ring 305. As depicted in FIG. 3, the power ring 305 runs along the periphery of tie integrated circuit device 310 and is connected to the always on power island 331 of the domain 321. The power ring 305 provides power for certain cells, such as routing and logic cells for input output blocks, pads, and the like, and for maintaining asserted values on an input output pin of the device when a functional block placed in sleep mode or otherwise shut down. The SOC utilizes the power ring as a power distributing circuit, or simply a power circuit, along tie periphery of the device that is optimized to occupy as little semiconductor die area as possible.

The CPU power island 332 is within the domain 322. The CPU power island 332 provides the computational hardware resources to execute the more complex software-based functionality for the SOC 310. The GPU power island 333 is also within the domain 322. The GPU power island 333 provides the graphics processor hardware functionality for executing 3-D rendering functions. The video processor island 335 is also within the domain 322. The video processor island 335 provides specialized video processing hardware for the encoding of images and video. The non-power gated functions island 334 is also within the domain 322. In the present embodiment, the term "non-power gated functions" refers to the characteristic that the island 334 does not include any power gating logic or components for turning off tie island 334 when the domain 322 is on. Consequently, whenever the domain 322 is on, the non-power gated functions island 334 is also on.

The memory 370 is an external memory that is coupled to the SOC 310. The memory 330 provides the execution environment for the CPU island 332. In typical usage scenarios, the operating system software and/or application software is instantiated within the memory 330. In one embodiment, the memory 330 is implemented as a specialized DRAM that can enter a self refresh mode. In such an embodiment, the volatile memory 330 can be set to self refresh and thereby maintain its content independent of the memory controller as the SOC 310 is placed into sleep mode.

Figure 4:
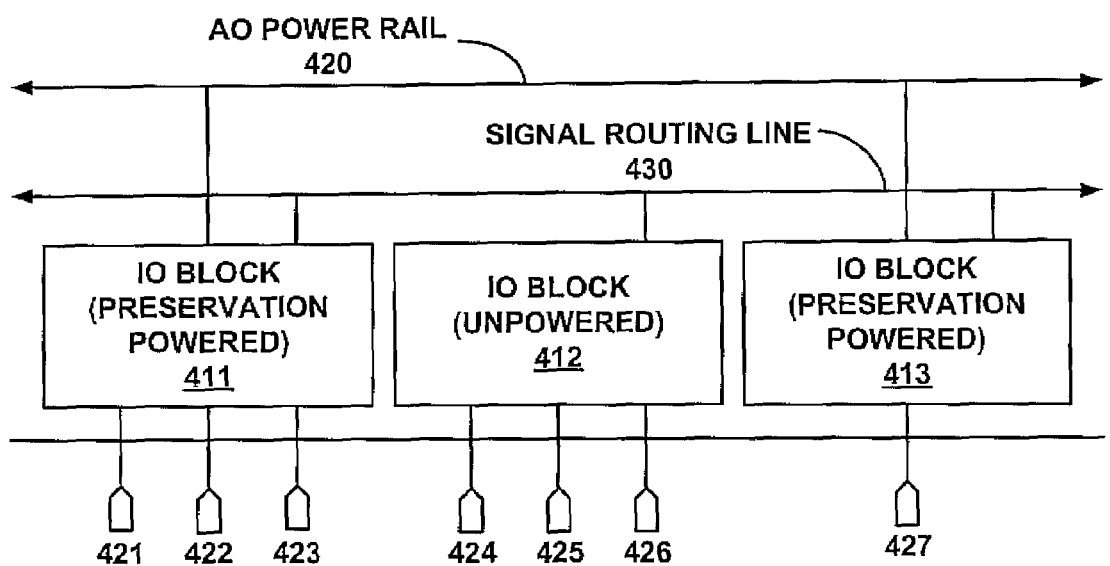
FIG. 4 shows a more detailed diagram of a portion of the power ring in accordance with one embodiment of the present invention.

FIG. 4 shows a more detailed diagram of a portion of the power ring 305 in accordance with one embodiment of the present invention. As depicted in FIG. 4, the power ring is shown alongside a corresponding signal routing ring 430. A plurality of input output blocks 411-413 are also shown.

As shown in the FIG. 4 embodiment, the input output blocks are included in the SOC and are for receiving external inputs for the device and for providing outputs from the device. This is shown as tie input output pins 421-427. When the SOC enters the low-power mode, the core of the device is shut down and those input output blocks which are not needed are also shut down. The power circuit is coupled to provide power to the always on input output blocks to maintain state when the integrated circuit device is in the low-power mode. The always on input output blocks need to be kept alive during low-power mode in order to receive any walk signals from the outside world. The "keep alive" current is provided by the connection to the power ring. This allows the SOC device to maintain state and to detect signals via the one or more "keep alive" input output blocks.

It should be noted that the input output block 412 is an unpowered input output block. This means that the input output bloc 412 does not receive power when the device enters sleep mode. As shown in FIG. 4, the block 412 is not coupled to receive power from the AO power rail 420. Thus, the block 412 is part of the core power domain, while the blocks 411 and 413 are part of the always on power domain.

Figure 5:
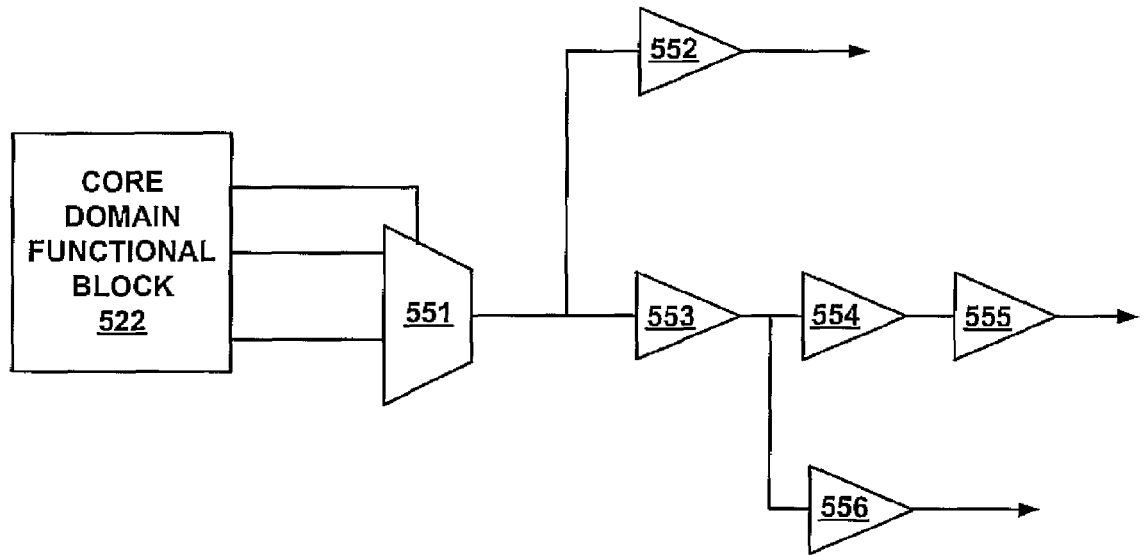
FIG. 5 shows a diagram of an exemplary portion of a netlist that represents the integrated circuit design of the design to be realized in physical form.

FIG. 5 shows a diagram of an exemplary portion of a netlist 500 that represents the integrated circuit design of the device 310 to be realized in physical form. As depicted in FIG. 5, a core domain functional block 522 and its connection to a plurality of cells 551-556 is shown.

Embodiments of the present invention utilize an iterative per cell search process to identify those cells of an integrated circuit netlist that do not need to be powered during sleep mode and ensure the cells are not wastefully lacking current when the device is in standby. As described above, the always on power domain provides power to certain cells so that they can reliably maintain state and reliably respond to external inputs. However, to minimize leakage current, only those cells that need to function to support the always on power domain should be powered when the device is placed into sleep mode.

The iterative per cell search process provides a reliable and efficient method of finding cells which provide no functionality in sleep mode. This enables embodiments the present invention to avoid overly conservative signal routing and cell architecture techniques. Such techniques routinely couple signal routing and I/O cells to the always on domain. Cells which provide no functionality in sleep mode can be identified and correctly moved from the always on power domain to the core power domain.

Referring still to FIG. 5, the iterative search process is implemented on a computer aided design system (e.g., a computer system 100 of FIG. 1) which executes the software-based method for modifying netlist cells of an integrated circuit device to reduce power consumption. The iterative search functions by determining those cells of the circuit netlist that are coupled to an always on power domain (e.g., which remains powered when the device enters a sleep mode, standby mode, etc.), and determining those cells of the circuit netlist that are coupled to a second domain, in this case the core domain 322. As described above, the core domain 322 is configured to shut down in sleep mode.

In the FIG. 5 embodiment, the iterative search begins at a core domain functional block, in this case, the block 522. The search proceeds from the core domain functional block and traces each of the cells leading from the block. Since these cells are coupled to only convey outputs from the core domain functional block 522, it follows that they can safely be shut down when power to the block 522 is shut down. The search tags such cells and modifies them to ensure that they are coupled to receive power from the core power domain. The cells 551-556 each flow from the core domain functional block. Thus, when power to core domain is shut down, those cells are also shut down.

In one embodiment, the per cell iterative search functions by examining each cell of the circuit netlist and altering the examined cell upon determining whether the examined cell is coupled to the core domain. The cell is examined to ensure that it receives an input only from the core domain, and that there is no input that ultimately comes from the always on domain. When such a cell is found, it is altered to ensure it receives power from the core domain.

In one embodiment, the per cell iterative search is complete when each cell of the circuit netlist is examined and no alterations are performed. In this manner, the iterative search functions similarly to a "bubble sort", where a specific cell is examined in the netlist, and if no alteration is needed, the next cell is examined, and so on. When an alteration is needed, the process begins again. Eventually, all of the cells of the netlist can be examined without any of them requiring alteration. At that point, the process is complete.

Figure 6:
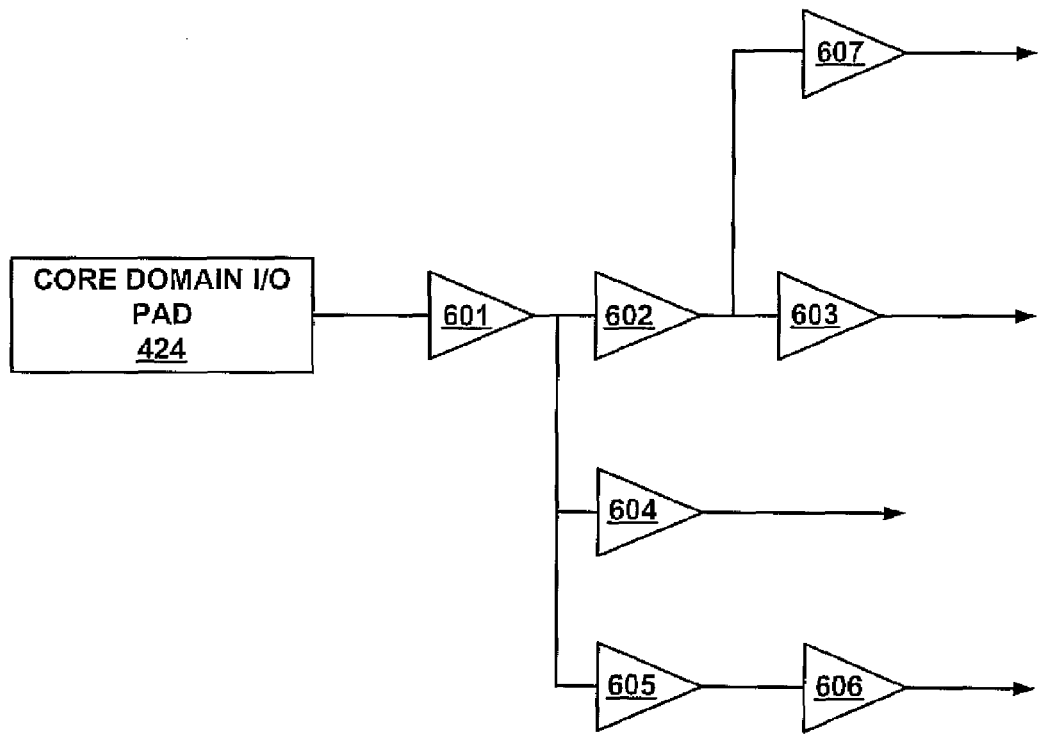
FIG. 6 shows a variation on the iterative search in accordance with one embodiment of the present inventions

FIG. 6 shows a variation on the iterative search in accordance with one embodiment of the present invention. FIG. 6 shows the iterative search beginning at the core domain I/O pad 424. The per cell iterative search is initiated at the input output pad providing functionality for the core domain, and traces those cells that cascade from the input output pad 424. The core domain I/O pad 424 receives inputs from external signals that are only processed and accepted when the core is powered up. Thus, cells 601-607 for routing signals from the I/O pad 424 do not need to be powered if their destination is purely a core domain functional block (e.g., core domain functional block 522).

Figure 7:
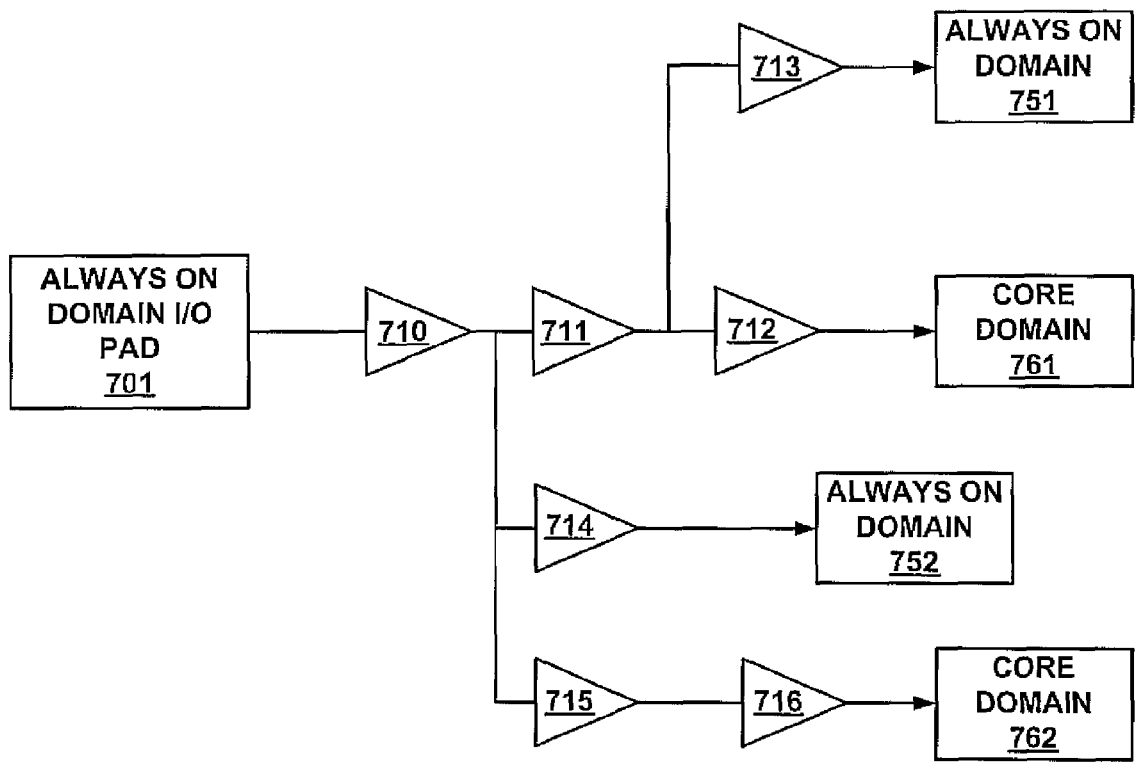
FIG. 7 shows a diagram depicting a two-way iterative of search in accordance with one embodiment of the present invention.

FIG. 7 shows a diagram depicting a two-way iterative search in accordance with one embodiment of the present invention. As depicted in FIG. 7, the search proceeds in both directions, from the I/O pad 701 and from the domains within the SOC. This allows the iterative search to be fine-grained and catch cells which may mistakenly not be found during a one-way search. For example, by searching from both directions, it can be found that although cells 710-712 have a source at tie always on I/O pad 701, they provide an input to the core domain 761 and the always on domain 751. Thus, cell 712 can be placed in the core domain while cells 710, 711 and 713 need to remain in the always on domain since they provide an input to the always on block 751. Similarly, the cells 714 needs to remain in the always on domain since it provides input to the always on block 752, however, the cells 715 and 716 can be moved to the core power domain.

In this manner, even though the cells provide signal routing for an always on domain I/O pad, the two-way search enables the identification of cells along this path that nonetheless can be shut off during standby. In this manner, embodiments of the present invention can identify those cells of an integrated circuit netlist that do not need to be powered during sleep mode and ensure the cells are shut down when the device is in standby or in deep sleep.

Figure 8:
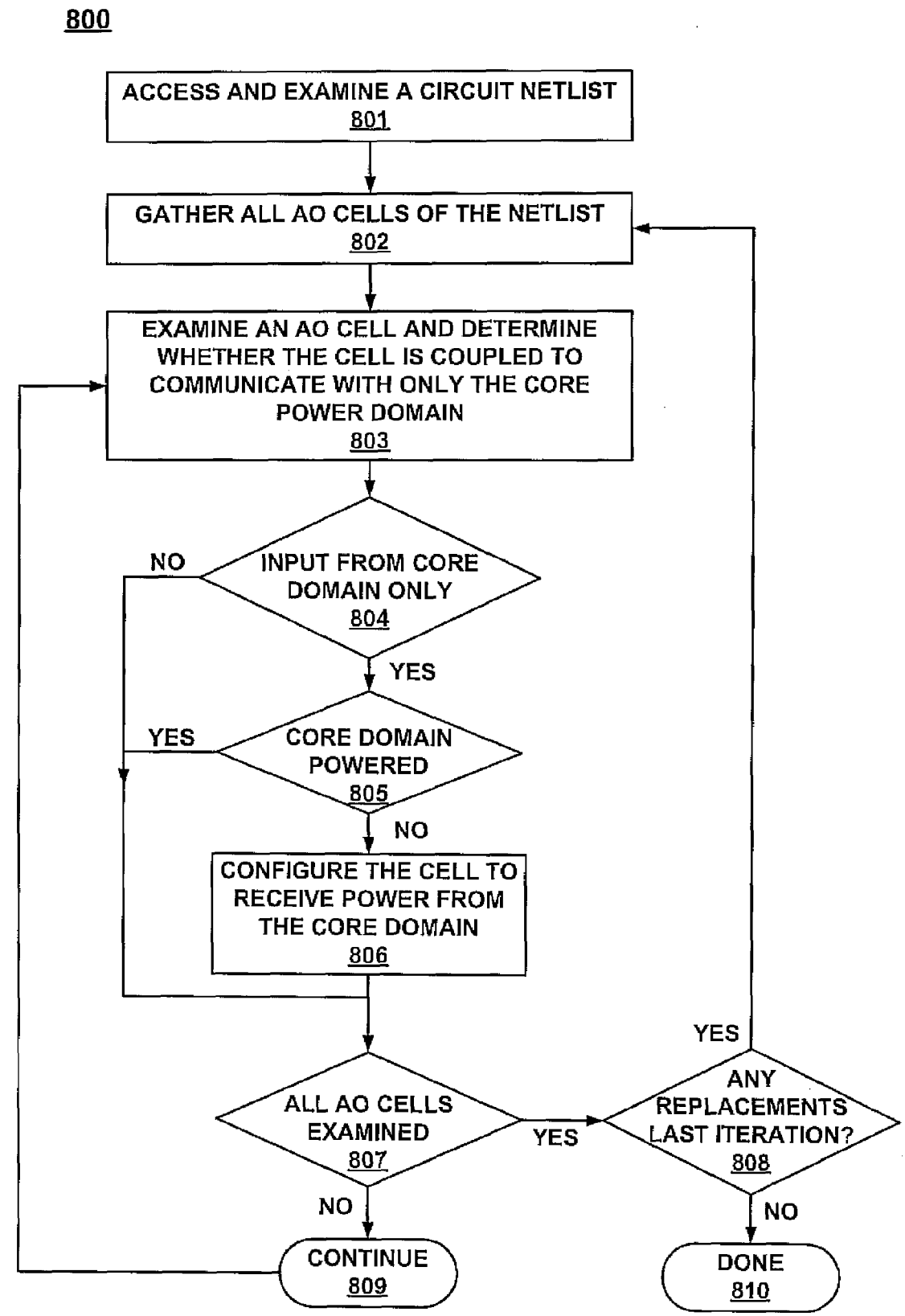
FIG. 8 shows a flowchart of the steps of an exemplary classification process in accordance with one embodiment of the present invention.

FIG. 8 shows a flowchart of the steps of an exemplary classification process 800 in accordance with one embodiment of the present invention. As depicted in FIG. 8, process 800 shows the operating steps of a netlist examination and power optimizing cell sorting process.

Process 800 begins in step 801, where the computer-aided design system accesses and examines a circuit netlist, the circuit netlist representing an integrated circuit design to be realized in physical form. In step 802, the search process 800 gathers all of the cells of the netlist that receive power from the always on domain. In step 803, the search process examines an always on cell and determines whether the cell is coupled to communicate with only the core power domain. In step 804, if all input or output is only with the core power domain, the process proceeds to step 805, and determines whether in fact the cell is currently configured to receive power from the core domain. If the cell is not configured for core domain power, the process proceeds to step 806, where the cell is modified and configured to receive power from the core domain as opposed to the always on domain. The process continues until all cells have been examined, as determined by step 807. As indicated by step 808, if during the last iteration, all cells have been examined without making a change, the process is finished, as shown by step 810. If during the last iteration, all cells have been examined and there has been at least one cell modification, process 800 proceeds to step 802 and begins a new iteration.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by tile claims appended hereto and their equivalents.

What is claimed is:

1. A computer implemented synthesis method for a programmable system-on-a-chip integrated circuit device, comprising:
   accessing a circuit netlist via the synthesis computer system, the circuit netlist representing a programmable system-on-a-chip integrated circuit design to be realized in physical form; and
   modifying a plurality of cells of the circuit netlist by using a netlist cell iterative sorting process, wherein the sorting process functions by:
     determining those cells of the circuit netlist that are coupled to a first power domain, wherein the first power domain is configured to remain powered in a standby mode;
     determining those cells of the circuit netlist that are coupled to a second power domain, wherein the second power domain is configured to shut down in the standby mode; and
     configuring those cells that are coupled to the second power domain to receive power from the second power domain to enable shut down when the integrated circuit device enters standby mode.

2. The method of claim 1, wherein the first power domain is configured to retain power and selected device state data when the second power domain is shut down.

3. The method of claim 1, those cells that are coupled to the second power domain are shut down with reduced leakage current when power to the second power domain is shut down.

4. The method of claim 1, wherein the per cell iterative search functions by examining each cell of the circuit netlist and altering an examined cell upon determining whether the examined cell is coupled to the second power domain.

5. The method of claim 4, wherein the per cell iterative search is complete when each cell of the circuit netlist is examined and no alterations are performed.

6. The method of claim 1, wherein the per cell iterative search is initiated at a functional block within the second power domain and traces those cells that cascade from the functional block.

7. The method of claim 1, wherein the per cell iterative search is initiated at an input output pad providing functionality for the second power domain and traces those cells that cascade from the input output pad.

8. The method of claim 1, wherein the per cell iterative search is configured to ensure cells providing functionality for the first power domain are not altered to be powered by the second power domain.

9. A computer-aided design system for producing an integrated circuit netlist for a programmable system-on-a-chip integrated circuit device, the computer aided design system including a processor coupled to a computer readable memory having computer readable code, which when executed by the processor causes the computer-aided design system to:
    examine a circuit netlist, the circuit netlist representing a programmable system-on-a-chip integrated circuit design to be realized in physical form; and
    modify a plurality of those cells of the circuit netlist by using a netlist cell iterative sorting process, wherein the sorting process functions by:
        determining those cells of the circuit netlist that are coupled to a first power domain, wherein the first power domain is configured to remain powered in a standby mode to retain selected device state data;
        determining those cells of the circuit netlist that are coupled to a second power domain, wherein the second power domain is configured to shut down in the standby mode; and
        configuring those cells that are coupled to the second power domain to receive power from the second power domain to enable shut down when the integrated circuit device enters standby mode, and wherein the shut down reduces cell leakage current.

10. The computer-aided design system of claim 9, wherein the per cell iterative search functions by examining each cell of the circuit netlist and altering an examined cell upon determining whether the examined cell is coupled to the second power domain.

11. The computer-aided design system of claim 9, wherein the per cell iterative search is complete when each cell of the circuit netlist is examined and no alterations are performed, while ensuring cells providing functionality for the first power domain are not altered to be powered by the second power domain.

12. The computer-aided design system of claim 9, wherein the per cell iterative search is initiated at a functional block within the second power domain and traces those cells that cascade from the functional block, or initiated at an input output pad providing functionality for the second power domain and traces those cells that cascade from the input output pad.

13. The computer aided design system of claim 12, wherein the per cell iterative search identifies cells which provide no functionality in sleep mode.

\* \* \* \* \*